United States Patent [19]

Glaudel et al.

[11] 4,114,084
[45] Sep. 12, 1978

[54] TURBINE-GENERATOR PROTECTION SYSTEM WITH ELECTRONIC SAMPLING FILTER

[75] Inventors: Stephen P. Glaudel, Penn Hills Township, Allegheny County, Pa.; Norman T. Chambers, Indian Harbor Beach, Fla.

[73] Assignee: Westinghouse Electric Corp., Pittsburgh, Pa.

[21] Appl. No.: 735,718

[22] Filed: Oct. 26, 1976

[51] Int. Cl.² .......................... H02H 7/06; H02P 9/04
[52] U.S. Cl. ................................ 322/38; 290/40 R; 322/25; 361/20
[58] Field of Search ...................... 361/20, 21; 322/17, 322/19, 24, 25, 29, 32, 99, 100, 38, 58; 290/40

[56] References Cited

U.S. PATENT DOCUMENTS

| | | | |
|---|---|---|---|
| 3,167,702 | 1/1965 | Schonung et al. | 322/17 |
| 3,718,837 | 2/1973 | Yokota et al. | 361/20 |
| 3,836,822 | 9/1974 | Schonfeld et al. | 290/40 X |
| 3,849,666 | 10/1974 | Park | 290/40 X |

*Primary Examiner*—Robert J. Hickey
*Attorney, Agent, or Firm*—H. W. Patterson

[57] ABSTRACT

A system for protecting a turbine-generator power plant governed by signals representative of turbine mechanical power and generator electrical power to reduce at times the turbine mechanical power, with an electronic filter included therein for the purposes of filtering a periodic time varying component of the electrical power signal having a response time within adequate protective limits, is disclosed. More specifically, the electronic filter generates a train of fixed time durations wherein during each fixed time duration the maximum and minimum amplitudes of the electrical power signal are selected. A signal is sampled at the end of each fixed time duration and held constant for each next fixed time duration, said signal being representative of the average of the maximum and minimum amplitudes selected during each fixed time duration. In employing these sampled filter techniques, the electronic filer can respond to electrical power signal disturbances with a response time approximately equal to one fixed time duration while generating a sampled average signal of the electrical power signal free of the time varying component.

11 Claims, 13 Drawing Figures

TURBINE-GENERATOR PROTECTION SYSTEM WITH ELECTRONIC SAMPLING FILTER

BACKGROUND OF THE INVENTION

This invention relates to turbine-generator power plant protection systems and more particularly to such systems utilizing an electronic sampling filter. A steam turbine power plant converts the temperature and pressure energy of a motive fluid into rotational mechanical energy to drive an electrical generator element which effects a further conversion into electrical energy for an associated electrical load. The output of the generator to the load is usually three-phase electrical power, which is delivered over a suitable distribution network to the ultimate energy user.

Appropriate safeguards are provided in the power system distribution networks to protect against line faults which may occur as a result of material shorting across a line or lines, lightning or improper installation during construction, for example. However, these safeguards do not in all cases protect the operation of the power generation facility from such line faults. As an example, the occurrence of a power line fault resulting in an eventual partial load drop causes a momentary disturbance in the power line frequency. Should a turbine-generator remain on-line during such a frequency disturbance, a transient phase condition will result between the turbine mechanical power and generator electrical power. If the fault is not cleared in a reasonable time period, the probability of a castastrophic turbine failure in response to the power mismatch will greatly increase. It is imperative then that measures be taken to affect the mechanical power, generally in control of steam flow through the turbine, instantaneously, upon detection of such a power mismatch. Response time in the order of less thab 1 second from the time of disturbance to the interruption of steam flow through the turbine is usually needed to provide adequate protection to turbine-generator operation in some cases.

Turbine manufacturers have typically provided safeguard systems known as "fast valving" to protect against the power mismatch transient due to a power system partial load drop. In one such a system, a convenient turbine pressure signal indicative of steam flow downstream of the interceptor valves (IV) is compared with the megawatt transducer electrical load signal for purposes of establishing a power mismatch beyond a predetermined value. Should a mismatch occur, a signal is directed to close a solenoid valve to dump the hydraulic fluid from the interceptor valve (IV) cylinder to cause rapid closure of the IV's thereby interrupting steam flow to the high torque producing intermediate pressure (IP) and low pressure (LP) turbines. Response times associated with the mismatch detection, solenoid energization and hydraulic cylinder fluid dump operations are in summation approaching the safeguard limits of adequate protection to a timely fault clearing. The response time of monitoring electrical load must be added to this summation to yield an ultimate response. It is of paramount importance to keep this overall response time within the safeguard limits.

The device which is normally used to monitor the power output of the generator entering the load network is known as a Hall-effect Watt Transducer. The output of the Watt Transducer is connected directly to the turbine control system; and is one parameter which is constantly monitored thereby. It has been observed and is well known that the output of the Watt Transducer contains a 120 Hertz component. It is possible that one of the fluctuations of the 120 Hertz component would make it appear, to the turbine control system, that a power mismatch beyond the predetermined value has occurred, thus initiating a "fast valving" response.

Usually some filter network is employed to remove the 120 cycle component to arrive at a meaningful reading of generated power. However, the time required to generate a signal indicative of the actual power level generated is excessive with respect to the ultimate time response. It is apparent, therefore, that some mechanism be provided for quickly determining an accurate indication of the actual average power reading, so that the total fast valving response time as outlined above is within the limits required to provide adequate turbine-generator protection against line frequency transients without causing erroneous "fast valving" reactions.

SUMMARY OF THE INVENTION

A system for protecting a turbine-generator power plant governed by signals representative of turbine mechanical power and generator electrical power to reduce at times the turbine mechanical power, with an electronic filter included therein for the purposes of filtering a periodic time varying component of the electrical power signal having a response time within adequate protective limits, is disclosed. More specifically, the electronic filter generates a train of fixed time durations wherein during each fixed time duration the maximum and minimum amplitudes of the electrical power signal are selected. A signal is sampled at the end of each fixed time duration and held constant for each next fixed time duration, said signal being representative of the average of the maximum and minimum amplitudes selected during each fixed time duration. In employing these sampled filter techniques, the electronic filter can respond to electrical power signal disturbances with a response time approximately equal to one fixed time duration while generating a sampled average signal of the electrical power signal free of the time varying component.

BRIEF DESCRIPTION OF THE DRAWINGS

The invention will be more fully understood from the following detailed description of the preferred embodiment, taken in connection with the accompanying drawings, in which.

DESCRIPTION OF THE PREFERRED EMBODIMENT

1. The Overall Environment

Figure 1:
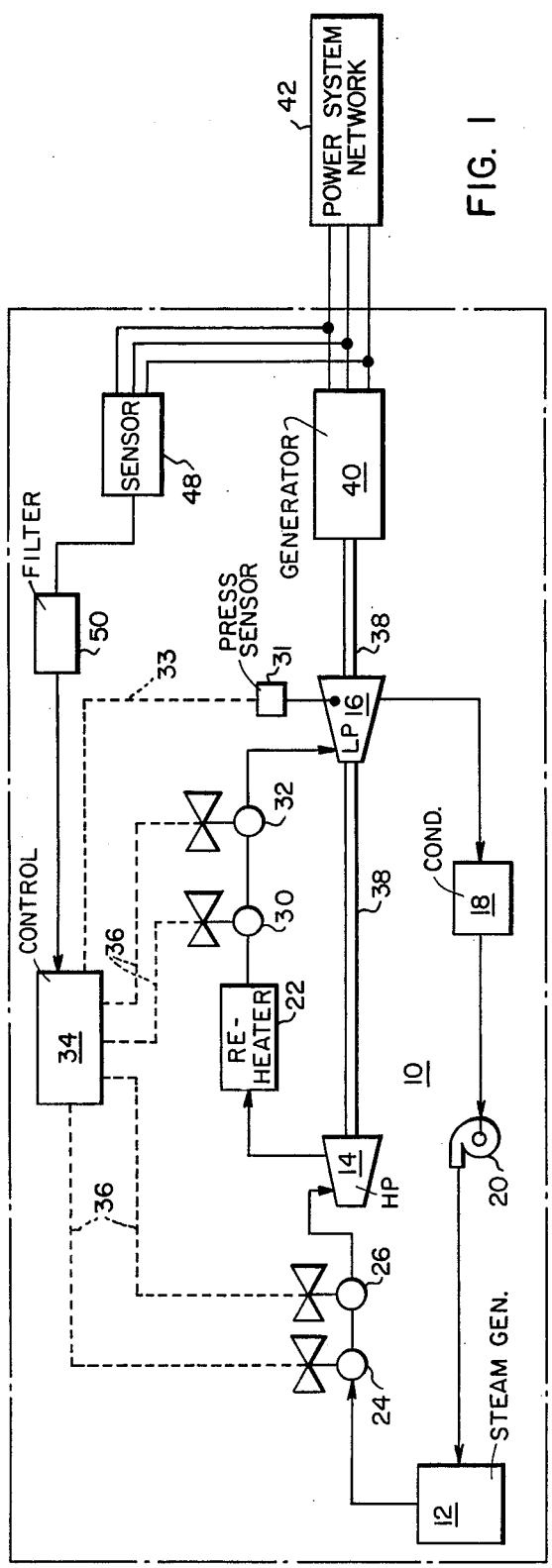
FIG. 1 is a schematic representation of a typical steam turbine power plant showing the general environment wherein an electronic sampling filter embodying the teachings of this invention might be utilized.

Throughout the following description, similar reference numerals refer to similar elements in all Figures of the drawings.

Referring first to FIG. 1, a schematic diagram illustrating a typical steam tubine power plant in which the electronic sampling filter embodying the teachings of this invention is shown.

The power plant 10 includes, in series, a steam generator element 12, a high pressure turbine element 14, lower pressure turbine elements 16, and a condenser element 18. Suitable pumping means 20 are, of course, provided. Intermediate between the turbine elements 14 and 16 is a moisture separator reheater element 22, which is typical in nuclear power generation facilities. It is to be noted, however, that although the invention is described in the context of a nuclear power generation facility, it is also applicable in a conventional fossil fuel power plant.

Disposed at various locations throughout the plant 10 in a flow control capacity are appropriate valving means, including main stop and governor valves 24 and 26, respectively, and low pressure stop and interceptor valves 30 and 32, respectively. The valves are all controlled by a suitable control system 34, which, through control interconnections 36, controls the operations of each valve connected within the plant 10.

The turbine elements 14 and 16 are commonly connected to a shaft 38, the turbines converting the temperature and pressure energy of motive steam into rotational mechanical energy of the shaft 38. An electrical generator element 40 is operatively connected to and driven by the shaft 38, and converts the mechanical energy of the shaft 38 into three-phase electrical energy. The electrical energy is delivered to a power system network 42. The power system network 42 may contain suitable load disconnect facilities as is well known in the art.

Connected within the power plant 10 to monitor the average power passing to the distribution network 42 is a Hall-effect Watt Transducer 48 which ultimately provides an input to the system control 34. Also, monitoring pressure indicative of steam flow in the lower pressure turbines is a conventional pressure transducer 31 providing a signal 33 to the system control 34. As discussed in the background, it is possible that a disturbance in the network 42 may inadvertently cause the control means 34 to initiate within a predetermined time period a fast closure of the interceptor valves 32 causing a flow interruption in the lower pressure turbine elements at inappropriate times known more commonly as "fast valving". The "fast valving" system of control means 34 may be of the type described in U.S. Pat. No. 3,643,437, "Overspeed Protection System For A Steam Turbine Generator", by Manfred E. Birnbaum, et al, issued Feb. 22, 1972, which is incorporated as a reference herein for a more detailed understanding thereof. It is therefore for the purpose of presenting a highly responsive signal representative of the power generated to the network 42 by the Watt Transducer 48 to the control system 34 that the electronic sampling filter 50 is disposed within the plant 10.

2. The Waveforms

Figure 2A:
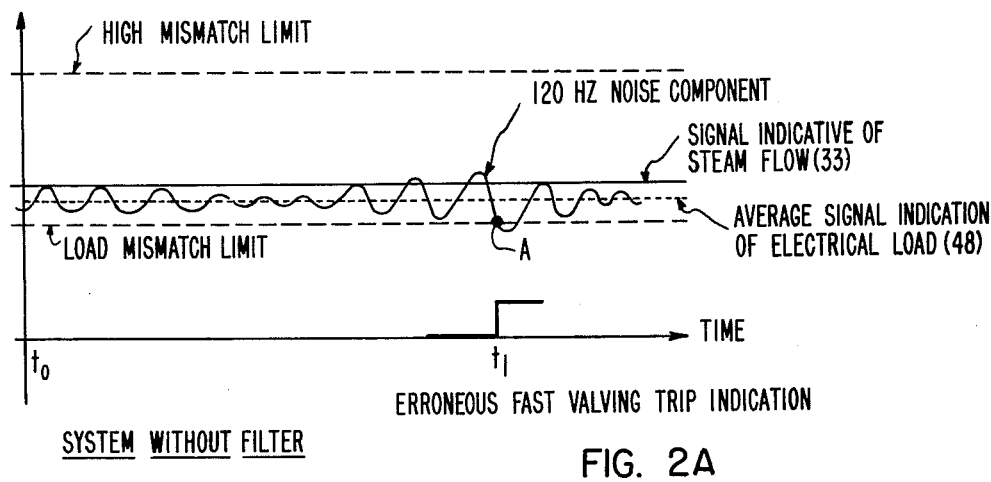
FIGS. 2A and B is a waveform representation of signals at various points in the system and useful in understanding the teachings of this invention.

Referring to FIG. 2A, a voltage-time representation of the signal conveyed from the Watt Transducer 48 to the control system 34, absent the filter 50 disclosed herein, is shown being compared to the pressure signal 33 indicative of turbine steam flow. As seen, from time $t_0$ to $t_1$, the 120 Hz time varying electrical component output of the Watt Transducer 48 to the control 34 is not of sufficient magnitude to trip a "fast valving" reaction. During the period $t_0$ to $t_1$, the plant 10 is normally functioning and the distribution network 42 has experienced no disturbance. However, at time $T_1$, an event occurs which causes the time varying electrical component output of the Watt Transducer 48 to increases in magnitude such as to affect an erroneous "fast valving" reaction. Such a possibility is depicted as at point A. Thus, even though a partial load drop has not in fact occurred, the system 34 may be deceived into believing that it has occurred and trigger the appropriate response.

Figure 2B:
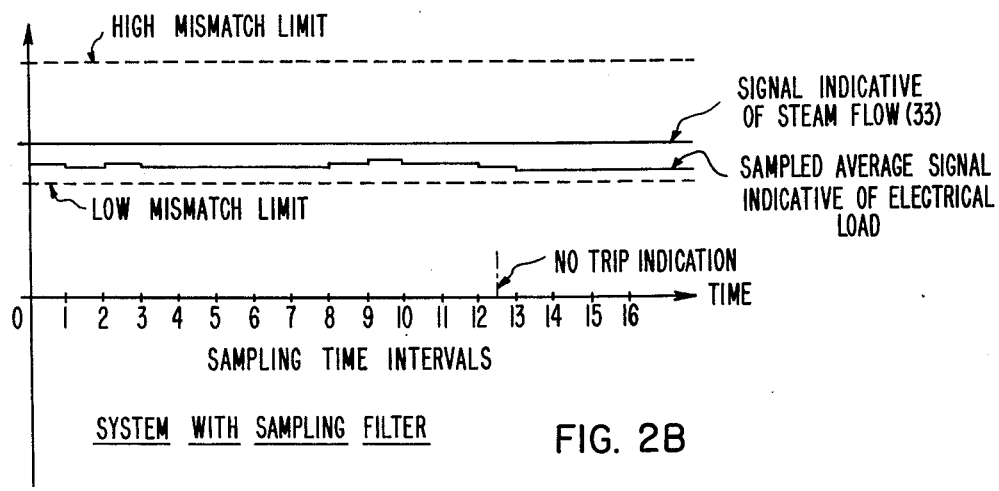

With the filter 50 disclosed herein interposed between the Watt Transducer 48 and the system 34, however, the input signal to the control system 34 will be as depicted in FIG. 2B. That is, the 120 Hz component voltage levels are decreased from their Hall effect characteristic values; and, it is apparent that the signals received are clearly an acceptable representation of the electrical power and not the varying voltage shown in FIG. 2A. The reason for the stepped configuration of the sampled averaged signal to the system 34 will become apparent from the discussion which follows. It is clear, however, that by filtering out the fluctuating 120 Hz component of the signal representative of the average power delivered to the transmission network 42 from the Watt Transducer to the control system 34, the possibility of erroneous or premature emergency responses by the control system 34 is avoided.

3. The Block Diagram

Figure 3:
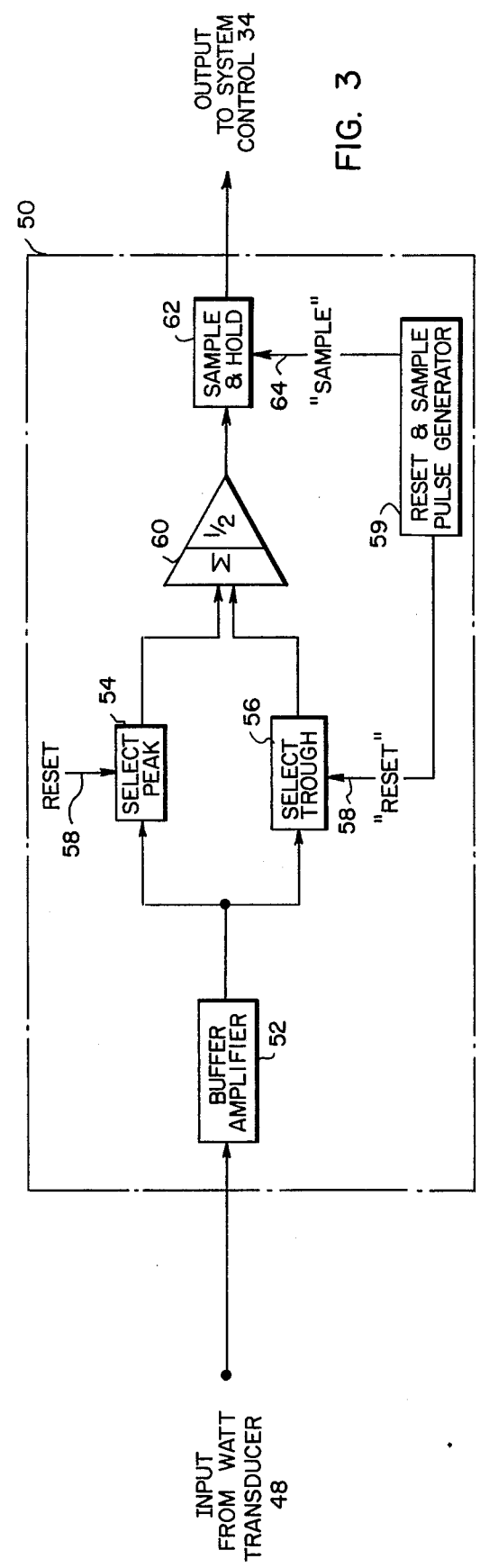
FIG. 3 is a block diagram description of the sampling filter embodying the teachings of this invention.

The operation of the sampling filter 50 will be understood from the block diagrammatic illustration shown in FIG. 3. As seen, the sampling filter 50 takes an input from the Watt Transducer 48 (having the waveform shown in FIG. 2A) and transmits an output to the control system 34 (having a waveform shown in FIG. 2B).

The electronic sampling filter 50 includes means 52 for amplifying the input signal taken from the Watt Transducer 48. Means 54 and 56 are provided to operate on the amplified signal and function, respectively, to select the highest crest and to select the deepest trough of the input signal. Each of the means 54 and 56 have a terminal 58 for receipt of a "RESET" pulse, generated from pulse generating means 59, as will be described herein.

The outputs from the means 54 and 56 are then connected to means 60 for determining the average of the values of the crest and trough. The means 60 therefore provides a signal essentially equal to the average value of the power to the transmission network 42, with the 120 Hz ripple produced by the unbalancing disturbance removed. Means 62 for sampling and holding the signal produced by the averaging means 60 are provided. In response to a "SAMPLE" signal received through terminal 64 from the pulse generating means 59, the means 62 periodically samples the output of the averaging means 60 and holds that signal for a predetermined period of time during which the control system 34 may examine the averaged signal to determine that the power to the network 42 has not dropped to a level which would necessitate the fast valving response above-discussed.

Figure 4:
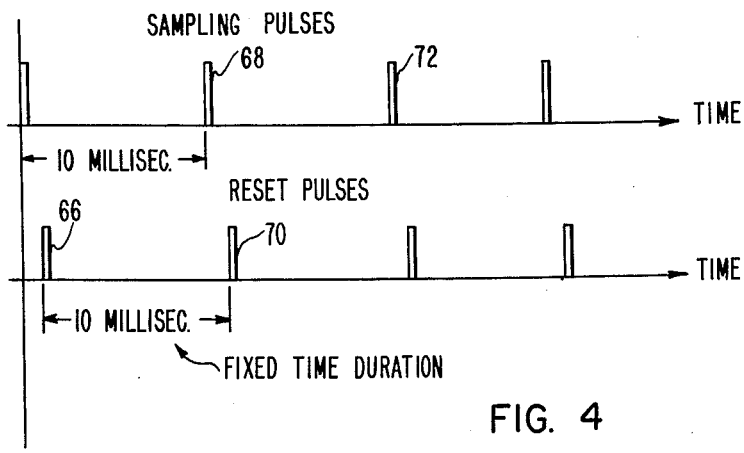
FIG. 4 illustrates the time relationship between pulses utilized by the sampling filter embodying the teachings of this invention.

In FIG. 4, the time relationship between the "RESET" and "SAMPLE" signals from the pulse generating means 59 is illustrated. In operation then, a "RESET" pulse 66 is transmitted to the means 54 and 56 to clear any previous value of voltage peak and trough, and to ready those mentioned means for the next incoming signal from the amplifying means 52. Upon receipt of the signal from the amplifying means 52, the peak and trough values of the incoming signal are determined by the means 54 and 56 during the time duration between reset pulses 66 and 70. These values are averaged by the means 60. Upon receipt of the "SAMPLE" pulse 68, the means 62 samples the voltage value at the output of the means 60 which is the average value of the peak and trough signals established between reset pulses 66 and 70 and holds that voltage value until triggered by the next sampling pulse 72, perhaps 10 msec. During this hold time, the averaged signal is displayed and transmitted to the control means 34, for a comparison with the pressure signal 33 indicative of turbine steam flow. At the end of the pulse 68, a new "RESET" pulse 70 is generated, and the process repeats.

It is appreciated that the voltage sampled and held by the means 62 is essentially a D.C. voltage representative of the power transmitted to the distribution network 42 as measured by the Watt Transducer 48. It is also understood that the 120 Hz fluctuating signal superimposed upon the signal from the Watt Transducer 48 has been eliminated by the averaging process performed within the filter 50. Further, referring to FIG. 2B, it may now be appreciated that the output signal from the filter 50 to the control system 34 exhibits the stepped configured waveform shown as sampling time intervals due to the action of the sample and hold means 62. It is possible that the magnitude of the 120 Hz voltage will fluctuate, and thereby modify the average peak-trough value which is displayed to the control 34. Of course, the voltage value displayed to the control 34 is very close to the low mismatch limit but is easily distinguishable therefrom as shown in FIG. 2B.

In the event that a load drop disturbance does occur in the power system network 42, the effect on electrical power output as monitored by Watt Transducer 48 will be detected within one sampling period, approximately 10 msec., utilizing the sampling filter 50 which is well within and adequate response time as discussed in the background.

Figure 5:
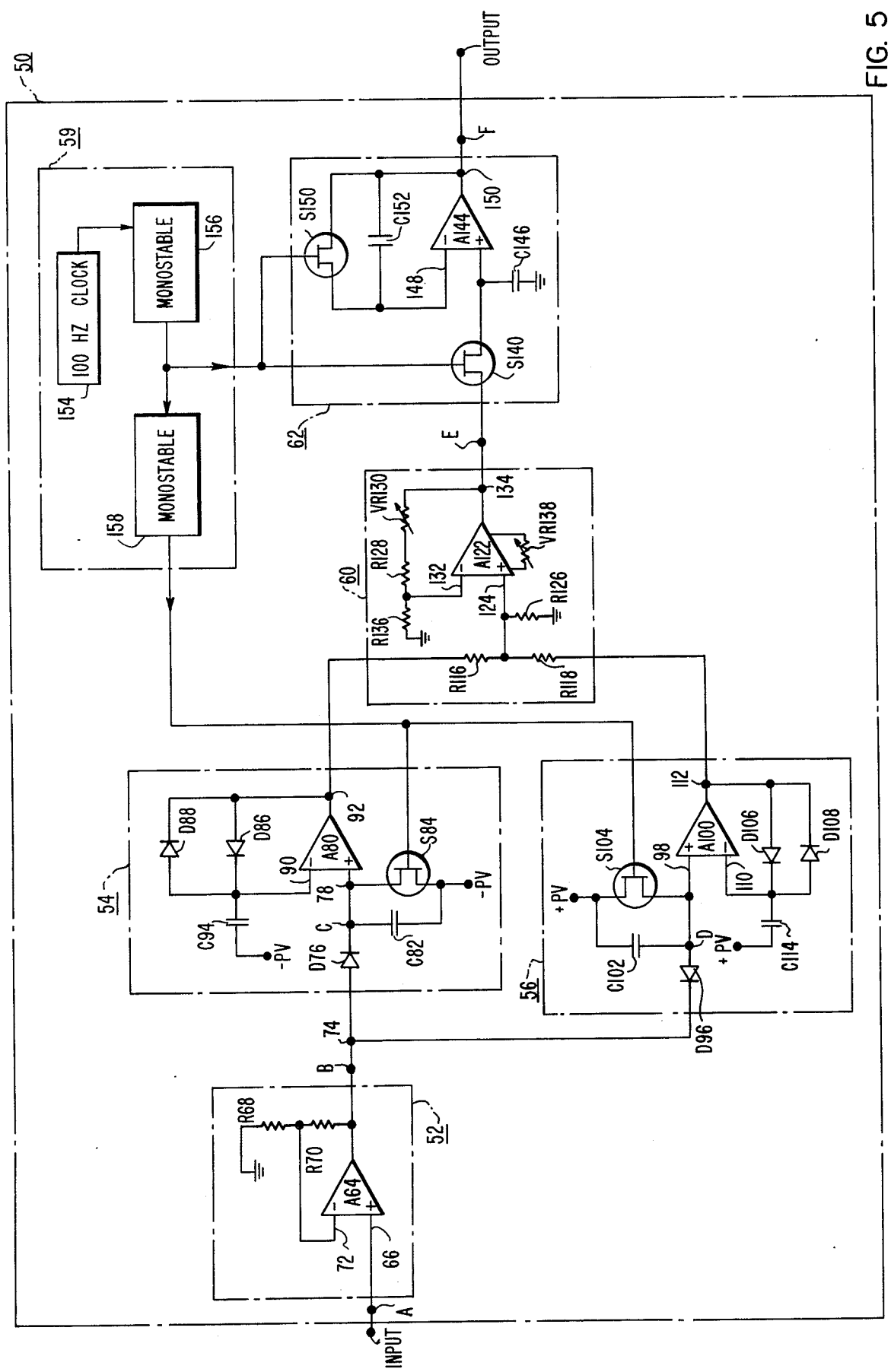
FIG. 5 is a schematic diagram of a specific sampling filter network embodying the teachings of this invention.

Having thus described the general principles of operation of the sampling filter 50 embodying the teachings of this invention, attention is directed to FIG. 5 wherein a detailed description of a typical implementing network is shown.

4. The Specific Circuitry

The means 52 includes an operational amplifier element A64 having the input signal from the Watt Transducer 48 connected to its non-inverting input channel 66. The amplifier A64 is associated with a resistor network including resistors R68 and R70 connected to the inverting input 72. The resistors R68 and R70 are chosen at appropriate values to control the gain of the amplifier means 52 and to thus raise the input signal from the Watt Transducer to a level suitable for operation upon the remaining elements of the filter 50.

The amplified signal at the output of the means 52 bifurcates, as at node 72, to the voltage peak selected means 54 and the voltage trough selecting means 56. The peak selecting means 54 includes a diode D76 connected in series with a capacitor C82 from the node 74 and the non-inverting channel 78 of difference amplifier A80 monitors the voltage of the capacitor C82. The diode D76 passes only the current of the amplified input signal that is flowing positive relative to the voltage across diode D76 from anode to cathode. The capacitor C82 charges to the maximum peak value of the signal passed by the diode D76. The capacitor C82 is connected to a predetermined negative potential $P_{volts}$ to ensure that when discharged, the signal on C82 initializes to the lowest possible potential. Connected across the capacitor C82 is an electronic switch S84, shown in the figure as a Complimentary Metal Oxide Semiconductor (CMOS) such as CD4016A Quad Bilateral Switch, which is operative to discharge capacitor C82 in response to a RESET signal received from circuit 59. The operational amplifier A80 provides a high impedance to capacitor C82 while establishing the peak signal of node 74 at its output 92. The high open loop gain of A80 keeps the inverting input 90 nearly equal to the non-inverting input 78. The voltage drop across diode D86 compensates for the voltage drop across D76 thereby establishing the peak voltage of node 74 at the output of A80. The diode D88 is used to provide a discharge path for the impedance balancing capacitor C94 which is also connected to a predetermined negative potential volts. The peak selector means 54 thus described provides a signal at the output 92 thereof which is equal to the most positive voltage value of the input signal with respect to the negative potential $P_{volts}$.

The trough selecting means 56 is similar in construction to the means 54 and includes a diode D96 connected in series with a capacitor C102 from the node 74 and the non-inverting channel 98 of a difference amplifier A100 monitors the voltage of the capacitor C102. The diode D96 passes only the current of the amplified input signal that is positive flowing relative to the voltage across diode D96 from anode to cathode. Capacitor C102 charges to a voltage value equal to negative peak (or trough) of the input signal passed by the diode D96. Connected to the capacitor C102 is a predetermined positive potential source of $P_{volts}$ such that when discharged, the signal on C102 initializes at the highest possible potential. An electronic switch S104, similar to switch S84, is in parallel with the capacitor C102 to discharge capacitor C102 in response to a RESET signal received from circuit 59. The operational amplifier A100 provides a high impedance to capacitor C102 while establishing the trough signal of node 74 at its output 112. The high open loop gain of A100 keeps the inverting input 110 nearly equal to the non-inverting input 98. The voltage drop across diode D106 compensates for the voltage drop across D96 thereby establishing the trough voltage of node 74 at the output of A100. The diode D108 is used to provide a discharge path for the impedance balancing capacitor C114 which is also connected to a predetermined positive potential $P_{volts}$. The negative peak selector means 56 thus provides at its output 112 a signal equal to the most negative value of the input signal with respect to the positive potential $P_{volts}$.

The signals at the outputs 92 and 112 are, respectively, representative of the maximum peak and minimum peak voltage of the input signal. These signals are averaged by the means 60 and a signal representative of this average is provided at the output of the means 60. The signals from outputs 92 and 112, respectively, pass through resistors R116 and R118 and are summed at a summing junction 120. The summing junction 120 is connected to an operational amplifier A122 at the non-inverting channel 124 thereof. A resistor R126 is connected between the channel 124 and the ground potential to produce a voltage resulting from the sum of the currents flowing through R116 and R118 which are proportional to the outputs 92 and 112, respectively.

Closed loop gain network, including resistor R128, variable resistor VR130 and resistor R136, is connected, as shown, to the inverting input 132 and output 134 of the amplifier A122. A balancing potentiometer VR138 is provided to permit zeroing of the amplifier A122 output when zero input is provided thereto. The signal present at the output 134 is representative of the average value of the input signals 92 and 112 which are representative of the power generated to the transmission network 42.

The output 134 of the averaging means 60 is connected to the sample and hold means 62. The sample and hold means 62 includes an electronic switch S140, similar to the previous switches described, connected to the non-inverting channel 142 of an operational amplifier A144. A capacitor C146 is connected between the channel 142 and ground potential. Connected between the inverting channel 148 of the amplifier A144 and the output 150 thereof is a parallel branch containing electronic switch S150 (similar to S140) and capacitor C152.

The signal generating means 59 includes a 100 Hz clock 154 which is connected to a monostable pulse generator 156 and, in series, to a second monostable trigger circuit 158. The circuit 156 generates "SAMPLE" command pulses which are conducted to the switches S140 and S150 in the sample and hold means 62 which initiate that function. The circuit 158 provides a "RESET" command pulse to the switches S84 and S104 in the means 54 and 56, respectively. Since the triggers 156 and 158 are connected in series relation, the "SAMPLE" pulse is generated before the "RESET" pulse. The generated "SAMPLE" and "RESET" command pulses define a train of fixed time durations.

5. The Operation of the Specific Circuitry

In connection with FIG. 6, which is a graphic illustration of the waveforms taken at various locations within the circuit of FIG. 5, an understanding of the operation of the circuitry there shown may be obtained. It is assumed that the circuitry has been cleared of any prior signals by receipt of a "RESET" pulse, in the description that follows.

At point A, the input of the filter 50, the rippled 120 Hz signal shown at A in FIG. 6, is introduced superimposed on an average amplitude denoted as $V_{AVG}$. The buffer amplifier means 52 amplifies the input signal so that the signal at point B, the output of the means 52, appears as shown in FIG. 6B, where, relative to the amplified average voltage, $AV_{AVG}$, the signal has an amplitude $AV_1$, with A being the gain of the amplifying means 52.

Figure 6A:
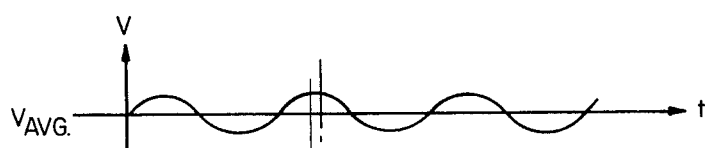
FIGS. 6A through 6G are graphic illustrations of waveforms taken from various portions of the schematic diagram of FIG. 5.
Figure 6B:
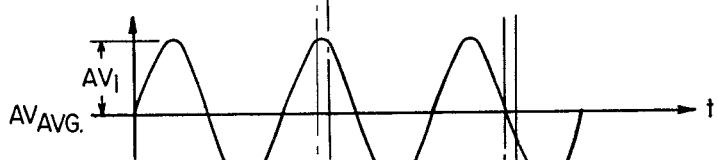
Figure 6C:
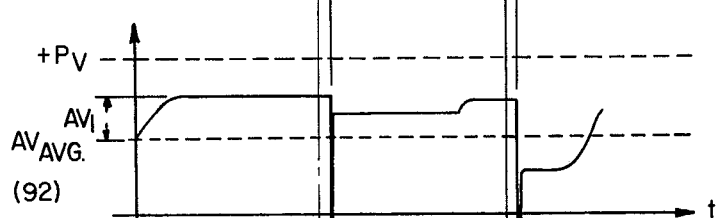
Figure 6D:
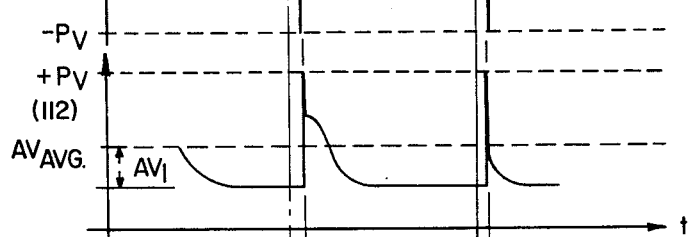

The signal splits at node 74 and enters the positive peak selecting means 54 and negative trough selecting means 56, where the signals at points C and D, past the diodes D76 and D96, are as shown in FIGS. 6C and 6D. The capacitors C82 and C102 are charged to the positive maximum and the negative maximum between reset pulse intervals 66 to 70 and 70 to 74 (see FIG. 6G). These signals are buffered by the operational amplifiers A80 and A100 and appear, increased in magnitude by one diode voltage potential, at the outputs 92 and 112, respectively. These signals are averaged within means 60, and a value equal to the averaged signal appears at the output 134 of the means 60, as seen at point E as shown in FIG. 6E.

Figure 6E:
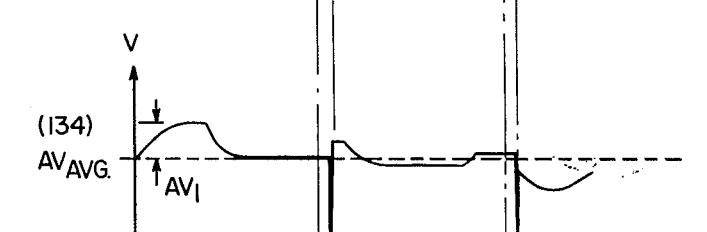
Figure 6F:
Figure 6G:
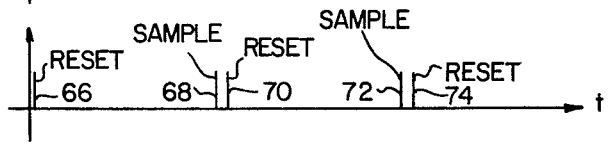

Referring back to FIG. 5, the "SAMPLE" pulse 68 (see FIG. 6G) from the trigger monostable 156 switches S140 and S150 both to the closed state, wherein switch S140 permits the capacitor C146 to charge to the instantaneous average voltage output 134 as shown in FIG. 6E. Receipt of the "sample" pulse by switch S150 momentarily short-circuits the capacitor C152 and permits the amplifier A144 to act as a voltage follower. Thus the voltage appearing at C146 also appears at the output 150 of A144. After the "SAMPLE" pulse 68 has passed the capacitor C146 still retains the average voltage captured during the "SAMPLE" pulse 68 interval, and it is this voltage value which is displayed to the control system 34. The output voltage 150 of A144 is held until a new output of average means 60 is sampled by the means 62. In order to obtain a new peak and trough voltage values, the RESET pulse 70 from means 158 is received by the switches S84 and S104, which clears the capacitors C82 and C102 as shown in FIGS. 6C and 6D, respectively. The next set of peak and trough values are established as previously described with the circuitry of FIG. 5 in the time duration between RESET pulse 70 and SAMPLE pulse 72. Again, with the execution of the sample and hold operation of circuit 62 as controlled by SAMPLE pulse 72 a new average voltage value is provided to control system 34. The sampling operation repeats itself with the next RESET pulse 74. In this manner, the circuitry shown in FIG. 5 acts to filter the 120 Hz electrical signal component from the input signal and provides an accurate and speedy indication to the control system 34.

The embodiment referred to herein, particularly that of the circuitry of FIG. 5, is provided merely to facilitate a better understanding and description of the invention. It is understood that other circuit designs may have been used for the peak detector and sample-and-hold circuits without deviating from the principles of the invention. It is rather desired that the invention not be limited by this embodiment but allowed an interpretation on its broad principles.

We claim:

1. A turbine-generator power generation plant coupled to a power system network, said power plant including an electronic turbine-generator protection system comprising:
   first means to generate an electrical signal representative of actual turbine power;
   second means to generate an electrical signal representative of actual generator power, said electrical generator power signal including a periodic time varying component; and
   third means responsive to said electrical generator power signal to generate a train of fixed time duration electrical signal amplitudes wherein each amplitude of said train is representative of an average of selected amplitudes of said electrical generator power signal; and
   fourth means governed by said electrical turbine power signal and said train of fixed time duration electrical signal amplitudes to reduce at times said turbine power.

2. A plant according to claim 1 wherein the fixed time durations of train of electrical signal amplitudes are each not less than the period of the time varying component of the electrical generator power signal.

3. A plant according to claim 2 wherein said third means selects the maximum and minimum amplitudes of the electrical generator power signal during each fixed time duration of the train of electrical signal amplitudes.

4. A plant according to claim 3 wherein each fixed time duration amplitude in the train of electrical signal amplitudes is representative of the average of the maximum and minimum amplitudes of the electrical generator power signal selected during each preceding fixed time duration.

5. A plant according to claim 1 wherein said fourth means is responsive to an electrical signal representative of the difference occurring concurrently between the electrical turbine power signal and the train of fixed time duration electrical signal amplitudes to reduce the turbine power, only at times when said difference signal is greater than a predetermined value.

6. An electronic system to protect a turbine-generator power plant, wherein said system is governed by electrical signals representative of actual turbine power and generator power to reduce at times the turbine power, said system including a filtering means to filter a periodic time varying component of said electrical generator power signal, said filtering means comprising:

control means to generate a train of command sets, said command sets including at least a sample command and a reset command wherein said command sets are separated by fixed time durations;

first means initiated by each of said reset commands to generate a signal representative of the maximum amplitude of the time varying electrical generator power signal which exists during each fixed time duration between said reset commands of said train;

second means initiated by each of said reset commands to generate a signal representative of the minimum amplitude of the time varying electrical generator power signal which exists during each fixed time duration between said reset commands of said train;

averaging means to generate a time varying signal representative of the instantaneous average of the maximum and minimum amplitude signals generated by the first and second means, respectively; and sample and hold means responsive to said sample commands to generate sampled signals representative of the instantaneous value of said signal generated by said averaging means at times concurrent with each of said sample commands wherein said sampled signals are held for the fixed time durations between said simple commands, whereby said filtering means generates a train of fixed time duration signals representative of the sampled average of the electrical power signal.

7. A system according to claim 6 wherein the fixed time duration separating command sets in the train of command sets is not less than the period of the time varying component of the electrical power signal.

8. A system according to claim 6 wherein the sample command precedes the reset command in time during each generation of a command set within the train of command sets.

9. A system according to claim 6 wherein each reset command initializes the generated signal of the first means to an amplitude below a predetermined amplitude range of the electrical generator power representative signal.

10. A system according to claim 6 wherein each reset command initializes the generated signal of the second means to an amplitude above a predetermined amplitude range of the electrical generator power representative signal.

11. A system according to claim 6 wherein the fixed time durations between command sets are equal.

* * * * *